United States Patent
Namuduri et al.

(10) Patent No.: US 8,602,419 B2
(45) Date of Patent: Dec. 10, 2013

(54) TEMPERATURE ADAPTIVE RADIAL SHAFT SEAL ASSEMBLIES USING SHAPE MEMORY ALLOY ELEMENTS

(75) Inventors: Chandra S. Namuduri, Troy, MI (US); Alan L. Browne, Grosse Pointe, MI (US); Nancy L. Johnson, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/083,955

(22) Filed: Apr. 11, 2011

(65) Prior Publication Data

US 2011/0187054 A1    Aug. 4, 2011

Related U.S. Application Data

(62) Division of application No. 11/536,022, filed on Sep. 28, 2006, now abandoned.

(51) Int. Cl.
*F16J 15/32* (2006.01)

(52) U.S. Cl.
USPC .................. 277/309; 277/553; 277/931

(58) Field of Classification Search
USPC .......... 277/931, 932, 300, 551, 557, 309, 553
See application file for complete search history.

(56) References Cited

U.S. PATENT DOCUMENTS

| | | | |
|---|---|---|---|
| 2,255,613 A * | 9/1941 | Fisher, Jr. et al. | 277/555 |
| 2,511,386 A * | 6/1950 | Doyle | 285/112 |
| 3,361,430 A | 1/1968 | Reid | |
| 3,604,716 A | 9/1971 | Webert | |
| 3,813,105 A | 5/1974 | McQueen | |
| 4,240,643 A | 12/1980 | Becker et al. | |
| 4,424,865 A | 1/1984 | Payton, Jr. | |
| 4,429,854 A | 2/1984 | Kar et al. | |
| 4,445,694 A | 5/1984 | Flaherty | |
| 4,658,847 A | 4/1987 | McCrone | |

(Continued)

FOREIGN PATENT DOCUMENTS

| | | | |
|---|---|---|---|
| DE | 237700 | | 7/1986 |
| DE | 3725808 | * | 2/1988 |

(Continued)

OTHER PUBLICATIONS

Wang Xuyong et al., "New Material Used for Sealing", a Chinese publication, pp. 40-42.

(Continued)

*Primary Examiner* — Vishal Patel
*Assistant Examiner* — Nicholas L Foster
(74) *Attorney, Agent, or Firm* — Dierker & Associates, P.C.

(57) ABSTRACT

A dynamic shaft seal assembly for sealing a rotating or reciprocating shaft includes an elastic seal member having at least a portion thereof in sealing communication with the rotating or reciprocating shaft. A shape memory alloy element is in contact with the elastic seal member, the shape memory alloy element being discontinuously disposed about the elastic seal member, and being configured to i) directly apply a compressive force in a radial direction on the seal member against the rotating or reciprocating shaft, and ii) maintain the compressive force on the seal member as a function of temperature. The seal assembly is adapted to seal at a temperature ranging from about −55° C. to about 250° C. Methods including the seal assembly are also disclosed.

5 Claims, 2 Drawing Sheets

(56) References Cited

U.S. PATENT DOCUMENTS

| | | | |
|---|---|---|---|
| 4,747,603 A | | 5/1988 | Sugino et al. |
| 5,000,464 A | | 3/1991 | Yasui |
| 5,171,024 A | | 12/1992 | Janocko |
| 5,368,312 A | | 11/1994 | Voit et al. |
| 5,451,065 A | * | 9/1995 | Holder .......................... 277/390 |
| 5,560,278 A | * | 10/1996 | Lark .............................. 92/5 R |
| 6,019,025 A | | 2/2000 | St. Amand |
| 6,419,236 B1 | * | 7/2002 | Janian ........................... 277/553 |
| 6,547,250 B1 | | 4/2003 | Noble et al. |
| 2002/0113380 A1 | * | 8/2002 | Clark ............................ 277/650 |
| 2003/0057655 A1 | * | 3/2003 | Chehab et al. ................ 277/500 |
| 2004/0201180 A1 | * | 10/2004 | Shah et al. .................... 277/592 |
| 2005/0012277 A1 | | 1/2005 | Adrion et al. |
| 2005/0242521 A1 | | 11/2005 | Bock et al. |
| 2006/0163818 A1 | * | 7/2006 | Breen ........................... 277/553 |
| 2006/0220327 A1 | * | 10/2006 | Russell ......................... 277/611 |
| 2007/0037445 A1 | * | 2/2007 | Park et al. ..................... 439/578 |
| 2008/0296849 A1 | * | 12/2008 | Alacqua et al. ............... 277/593 |
| 2010/0102518 A1 | * | 4/2010 | Gao et al. ..................... 277/554 |

FOREIGN PATENT DOCUMENTS

| | | | |
|---|---|---|---|
| DE | 19653580 | | 6/1998 |
| DE | 10306728 | | 9/2004 |
| JP | 60168970 | * | 9/1985 |
| JP | 8166064 | | 6/1996 |
| JP | 2003262276 | | 9/2003 |

OTHER PUBLICATIONS

Feld, M. and A. Muhr, "Engineering Seals—Seals for Rotating Shafts," printed Jun. 14, 2006; http:/www.azom.com/details.asp?ArticleID=504, pp. 1-6.

Walter Gohl: "Elastomere—Dicht—und Konstruktionwerkstoffe" [Elastomers—Sealing and Constrution Materials], vol. 5, Expert Verlag, 4th edition, 1991.

German Office Action dated Dec. 13, 2010 in corresponding Application No. 102007045819.5 with English Translation, (11 pages).

* cited by examiner

TEMPERATURE ADAPTIVE RADIAL SHAFT SEAL ASSEMBLIES USING SHAPE MEMORY ALLOY ELEMENTS

CROSS REFERENCE TO RELATED APPLICATIONS

This application is a divisional of U.S. patent application Ser. No. 11/536,022, filed on Sep. 28, 2006, now abandoned the entire contents of which is incorporated by reference herein in its entirety.

BACKGROUND

The present disclosure relates to a temperature adaptive radial shaft sealing device that provides improved sealing over a wide range of temperatures while minimizing the friction and wear associated with the same.

Most automotive sub-systems such as the engine, transmission, driveline, suspension dampers, pumps, brakes and other hydraulic/pneumatic actuators utilize seals to prevent ingress of extraneous materials (dust, dirt, humidity, air etc.) into the actuators and/or egress of fluids from the actuators. The seals can be used in a static or a dynamic application. Most dynamic seals have at least one part of the seal in contact with a sliding or a rotating surface. As an example, a shock absorber has a cylindrical piston rod that reciprocates axially through a sealed bearing embedded at one end of a closed cylindrical tube that encloses a hydraulic fluid. As another example, most rotating elements in the transmission require the use of rotary dynamic seals to prevent leakage of the pressurized hydraulic fluid, e.g., prevent leaking past the shaft bearings.

Many types of radial shaft seals suitable for individual applications are available commercially. Each seal application has specific requirements in terms of the leakage rate, operating temperature range, maximum allowable friction, misalignment, cost, cycle life, and the like. In automotive applications, the ambient temperatures in which the seals must effectively operate typically range from about −40° C. to about 150° C. while the temperatures that some of the seals experience may be over an even wider temperature range, such as −55° C. to 250° C. or more. While commercially available radial shaft seals satisfy most of the requirements of a given application at one temperature extreme, it is difficult to satisfy all of the requirements at both temperature extremes. For example, it is oftentimes difficult to minimize seal friction at temperatures at the lower end of the extremes (freezing and below) while maintaining adequate seal friction/minimum leakage at the temperatures approaching the higher end of the temperature extremes (temperatures in excess of 100° C.). Most prior art seals utilize spring loaded elastomer materials to maintain adequate sealing over time and temperature. However, because of thermal expansion properties inherent to the materials (e.g., spring steel, aluminum, brass, and the like) used to form the spring, uniform spring loads do not occur over the wide temperature ranges to which seals are exposed such as experienced by dynamic seals used in the automotive environment.

The disadvantages of prior art radial shaft seals include, but are not limited to, excessive friction, excessive leakage, excessive wear, reduced life/durability, and non-uniform compliance/sealing pressure over the required operating temperature range, among others. Interestingly, the first two properties are at odds with each other in a dynamic sealing situation. Good compression forces holding the seal against a reciprocating or rotating member accelerate seal wear and shorten service life whereas reducing the compressive force can result in leaking, especially at the temperature extremes in which the dynamic seal device can be used. Therefore, every dynamic seal design is a compromise to produce an acceptable balance between these two desirable properties.

Accordingly, what is needed is an improved seal assembly that operates effectively and uniformly across a wide temperature range.

BRIEF SUMMARY

Disclosed herein are dynamic shaft seal assemblies and methods of use. In one embodiment, the dynamic shaft seal assembly for sealing a rotating or reciprocating shaft comprises an elastic seal member having at least a portion thereof in sealing communication with the rotating or reciprocating shaft; and a shape memory alloy element in contact with the elastic seal member, wherein the shape memory alloy element is adapted to change a shape orientation and or modulus property as a function of temperature change so as to change or maintain a compressive force and/or sealing area of the seal member portion against the rotating or reciprocating shaft at temperatures from −55° C. to about 250° C.

In another embodiment, a temperature sensitive adaptive seal comprises an elastomeric seal body; and a shape memory alloy element in compressive contact with the elastomeric seal body, wherein the shape memory alloy element is adapted to change a shape orientation and/or modulus property as a function of temperature change so as to change or maintain the compressive contact force and/or sealing area of the seal member portion against a component when the component is exposed to ambient temperatures of about −55° C. to about 250° C.

A method of mounting a radial shaft seal assembly onto a shaft, wherein the shaft has an outer diameter larger than an inner diameter of the seal assembly comprises mounting a seal assembly comprising a shape memory element in compressive communication with an elastic seal body portion, wherein the shape memory element is in an austenite phase, wherein mounting the seal assembly onto the shaft stretches the elastic seal body portion and the shape memory alloy element, wherein the shape memory element changes to a martensite phase and superelastically deforms and reverts to the austenite phase and a smaller diameter once the deforming stresses are removed.

A method of mounting a radial shaft seal assembly onto a shaft, wherein the shaft has an outer diameter larger than an inner diameter of the seal assembly, the method comprises mounting a seal assembly comprising a shape memory element in compressive communication with an elastic seal body portion, wherein the shape memory element is in an austenite phase, wherein mounting the seal assembly onto the shaft stretches the elastic seal body portion and the shape memory alloy element, wherein the shape memory element exhibits a stress induced change to the martensite phase and deforms superelastically; and maintaining a constant sealing force over a range of moduli exhibited by the elastic seal body portion.

A method of sealing a rotatable or reciprocating shaft comprises mounting a seal assembly comprising a shape memory element in compressive communication with an elastic seal body portion, wherein the shape memory alloy element is adapted to change a shape orientation and or modulus property as a function of temperature change so as to change or maintain a compressive force and/or sealing area of the seal member portion against the rotating or reciprocating shaft at temperatures from −50° C. to about 150° C.; and operating the seal assembly in an environment having a temperature differential of at least 50° C. and within a temperature range of about −55° C. to about 250° C.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
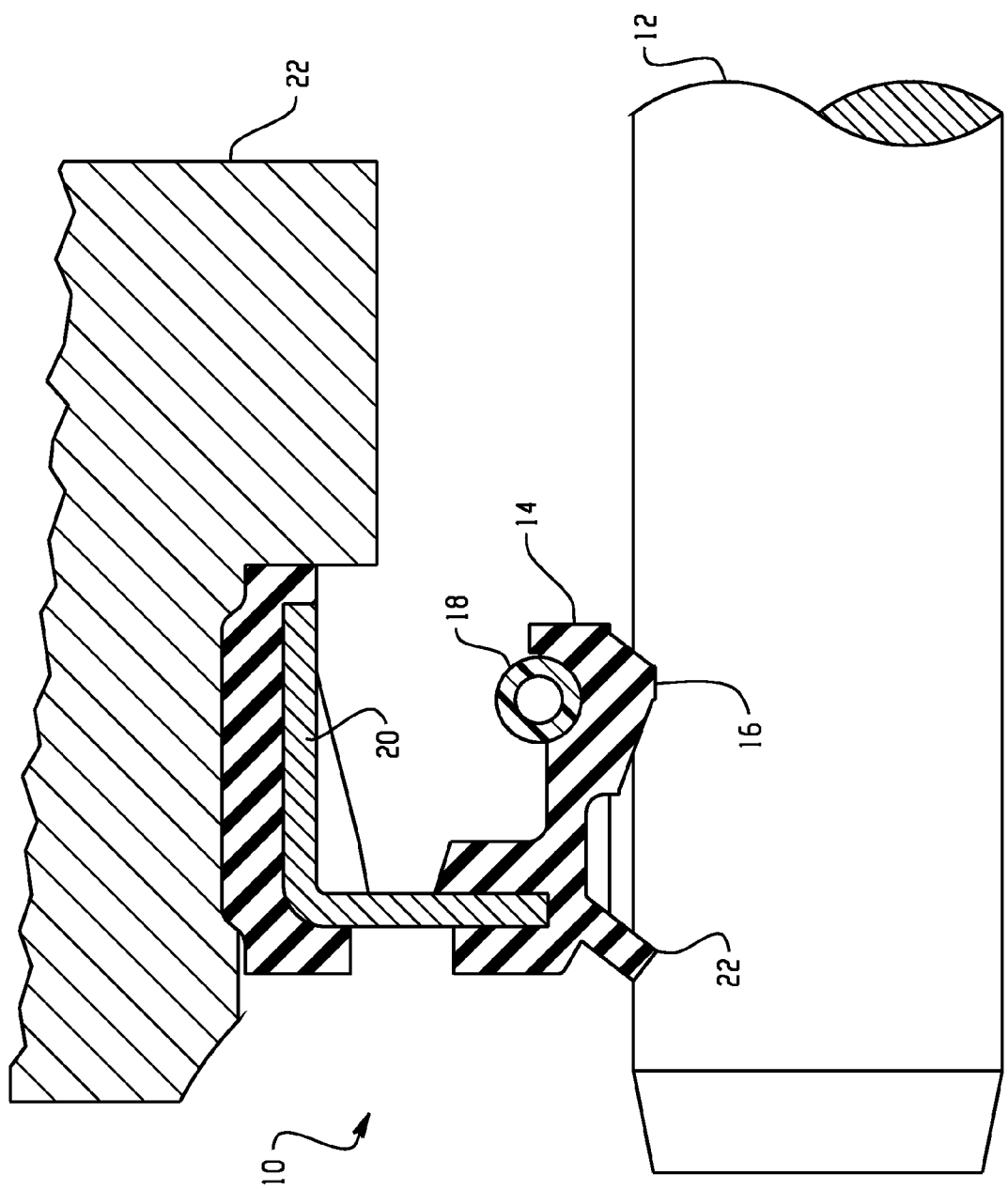
FIG. 1 is a schematic representation of a cross sectional view of a temperature adaptive radial seal assembly.
Figure 2C:
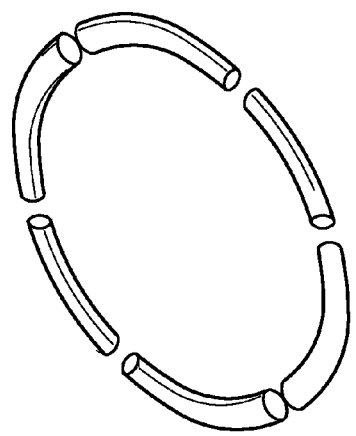
FIG. 2 illustrates perspective views of exemplary shape memory elements in accordance with the present disclosure.
Figure 2B:
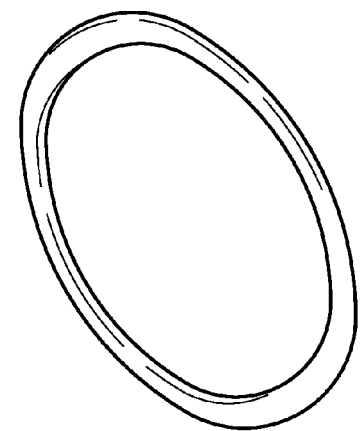
Figure 2E:
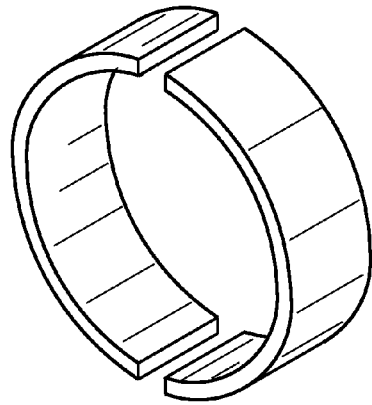
Figure 2A:
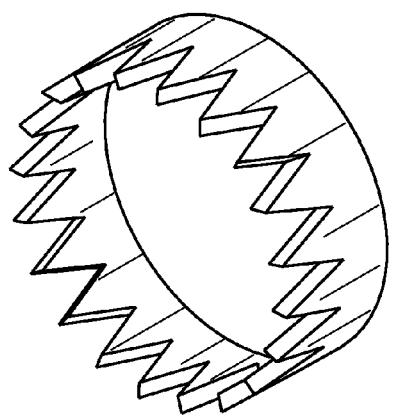
Figure 2D:
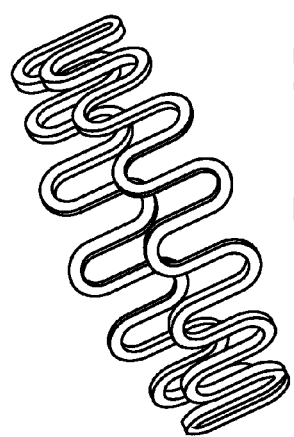

The present disclosure addresses the issues associated with the use of prior art dynamic radial shaft seal assemblies operating in such wide temperature extremes. It has been discovered that by integrating a shape memory alloy based element such as a spring, garter band, ribbon, or the like in place of or in addition to the standard metal garter spring or band used around a seal lip, and/or the metal casing overcomes the problems noted with the prior art seals. The shape memory alloy element is temperature sensitive and can be used to provide enhanced seal performance over a wide temperature range, reduced seal friction, reduced seal leakage, reduced wear, increased seal life and/or durability, and improved product reliability relative to prior art seal assemblies.

Shape memory alloys (SMA) exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. Selection of a suitable shape memory alloy composition depends on the temperature range where the component will operate.

FIG. 1 illustrates an exemplary dynamic radial shaft seal assembly 10 utilizing a shape memory alloy element. The seal assembly 10 is disposed in sealing communication with a rotating or reciprocating radial shaft 12 and generally includes a compressible seal body 14 having at least one seal lip 16 in sealing contact with the shaft 12. Disposed in compressive communication with the seal lip is a shape memory alloy element 18. The SMA element can be seated within a recess provided in the seal body. The seal device further includes a metal casing 20 for providing rigidity to the seal device and further assists in defining the inner and outer diameters of the seal device. The casing includes an axial portion and a radial portion. The axial portion extends upward and then bends inwardly at approximately 90° forming the radial portion.

Although reference has been made specifically to radial shafts, one of skill in the art will recognize that the cross sectional shape of a reciprocating shaft can vary and that the seal assemblies disclosed herein can be readily adapted to sealingly conform to the particular cross sectional geometry of the shaft.

Optionally, the seal device 10 may further include additional lips such as for preventing ingress of dust or other contaminants beyond the seal device. The diameters of the seal device 10 are such that it can snugly fit against an outer member 22 and the reciprocating or rotating shaft. The seal device is preferably toroidal in shape so as to snugly fit about a shaft circumference.

The SMA element can be configured in any structural form such as a continuous wire or a ribbon embedded within and conforming to the rotationally symmetric geometry of the seal body. FIG. 2 illustrates exemplary shapes and is not intended to be limiting. The elements could be of different geometries in the circumferential or axial directions including straight, crown, or wavy shape such as having a sinusoidal shape with hills and valleys extending in the radial sealing direction. The particular shapes, compositions, number of springs, and forms will generally depend on the application and the desired compressive load. For example, multiple individual wires/bands of SMA with different phase change temperatures could also be used to increase the stiffness in steps as the temperature increased to compensate for the continuing decrease in elastic modulus of the seal material. Likewise, an SMA wire/ribbon loop could be embedded within the seal body, which wire/ribbon would be in its austenitic phase under installation and normal operating temperatures for the seal device. This would provide a seal device, wherein the seal body and SMA element could be stretched dramatically to, for example, mount on a shaft; the SMA wire exhibiting a stress induced phase change to martensite form, i.e., superelasticity, which would cause it to revert to its smaller diameter and snug the shaft once the deforming stresses were removed.

In another embodiment, a method of mounting a radial shaft seal assembly onto a shaft, wherein the shaft has an outer diameter larger than an inner diameter of the seal assembly comprises mounting a seal assembly generally includes a shape memory element in compressive communication with an elastic seal body portion, wherein the shape memory element is in an austenite phase, wherein mounting the seal assembly onto the shaft stretches the elastic seal body portion and the shape memory alloy element, wherein the shape memory element exhibits a stress induced change to the martensite phase and deforms superelastically, the magnitudes of stress and deformation being sufficient to cause the shape memory alloy element to remain in the martensite phase and because of this maintain constant sealing forces over the range of moduli exhibited by the elastic seal body portion, e.g., over the full operating temperature range.

In yet another embodiment, discontinuous SMA elements are utilized (see FIGS. 2C and E), e.g., wherein the SMA element is impregnated, preferentially in circumferential and/or radial patterns into the seal body material to achieve the desired functionality. The shape memory alloy/composite material characteristics are chosen based on the seal requirements. If the base seal does not provide adequate sealing at high temperatures and has excessive friction at the low temperatures, the SMA characteristics can be tuned to increase the sealing pressure above a threshold temperature to prevent leakage, while at lower temperatures the excessive pressure may be released (due to the lower modulus of the lower temperature martensitic phase of SMA) to decrease seal friction or vice versa. The shape memory effect upon heating would act to restore the seal geometry and sealing pressure. While a lip type of dynamic shaft seal is shown as an example, it is possible to adopt the disclosure into the other types of seal geometries such as the O-rings, wear rings, V-rings, U-rings and other shapes for various applications, to obtain a temperature response adapted to the behavior and intended function of the seal. Typical materials used to manufacture these types of seals include, but are not limited to, nitrile, fluoroelastomer, polytetrafluoroethylene (PTFE), polyurethane, and the like. The SMA element can be embedded within or disposed, continuously or discontinuously on a surface of any one of the above noted seal geometries.

The body is preferably formed of an elastomer. Suitable elastomers include, polybutadiene, polyisobutylene, polyisoprene, styrene-butadiene-styrene, polyethylene, polysulfides, fluoroelastomers, nitriles, and the like.

Advantageously, the seal assembly with the shape memory elements improves seal wear and effectiveness over a wide temperature range, e.g., about −40° C. to about 150° C. for common automotive applications to as wide a range as −55° C. to 250° C. for more extreme automotive applications. In one embodiment, the temperature differential at which the seal assembly is exposed is greater than 50° C., and in other embodiments greater than 70° C., and in still other embodiments, greater than 100° C.

As used herein, the terms "first", "second", and the like do not denote any order or importance, but rather are used to distinguish one element from another, and the terms "the", "a", and "an" do not denote a limitation of quantity, but rather denote the presence of at least one of the referenced items. Furthermore, all ranges directed to the same quantity of a given component or measurement are inclusive of the endpoints and independently combinable.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A dynamic shaft seal assembly for sealing a rotating or reciprocating shaft, the seal assembly comprising:
   an elastic seal member having at least a portion thereof in sealing communication with the rotating or reciprocating shaft; and
   a shape memory alloy element in contact with the elastic seal member, wherein the shape memory alloy element comprises a plurality of wires circumferentially disposed about the portion of the elastic seal member, each of the plurality of wires having a different transformation temperature configured to increase a stiffness of the elastic seal member in steps as temperature is increased, and is configured to i) directly apply a compressive force in a radial direction on the seal member against the rotating or reciprocating shaft, and ii) maintain the compressive force on the seal member as a function of temperature;
   wherein the seal assembly is adapted to seal at a temperature range from about −55° C. to about 250° C.

2. A method of mounting the dynamic shaft seal assembly of claim 1 onto the shaft, wherein the shaft has an outer diameter larger than an inner diameter of the seal assembly, the method comprising:
   mounting the dynamic shaft seal assembly onto the shaft, wherein the shape memory alloy element is in an austenite phase, wherein mounting the seal assembly onto the shaft stretches the elastic seal member and the shape memory alloy element to superelastically deform the shape memory alloy element and change the shape memory alloy element to a martensite phase; and
   reverting the shape memory alloy element to the austenite phase and a smaller diameter once deforming stresses are removed.

3. The method of claim 2 wherein the shape memory alloy element includes axial portions.

4. A method of sealing the rotating or reciprocating shaft using the dynamic shaft seal assembly of claim 1, the method comprising:
   mounting the seal assembly onto the shaft; and
   operating the seal assembly in an environment having a temperature differential of at least 50° C. and at a temperature range from about −55° C. to about 250° C.

5. A method of using the dynamic shaft seal assembly of claim 1, wherein the shaft has an outer diameter larger than an inner diameter of the seal assembly, the method comprising:
   mounting the seal assembly onto the shaft, wherein the shape memory alloy element is in an austenite phase, wherein mounting the seal assembly onto the shaft stretches the elastic seal member and the shape memory alloy element, wherein the shape memory alloy element exhibits a stress induced change to a martensite phase and deforms superelastically;

operating the seal assembly in an environment having a temperature differential of at least 50° C. and at a temperature range from about −55° C. to about 250° C.; and maintaining a constant sealing force over a range of moduli exhibited by the elastic seal member.

* * * * *